US005469194A

United States Patent [19]
Clark et al.

[11] Patent Number: 5,469,194
[45] Date of Patent: Nov. 21, 1995

[54] APPARATUS AND METHOD FOR PROVIDING DIFFERENT INPUT DEVICE ORIENTATIONS OF A COMPUTER SYSTEM

[75] Inventors: Michael B. Clark, Glendale; Daniel S. Venolia, San Francisco, both of Calif.

[73] Assignee: Apple Computer, Inc., Cupertino, Calif.

[21] Appl. No.: 242,540

[22] Filed: May 13, 1994

[51] Int. Cl.⁶ .................................................. G09G 5/08
[52] U.S. Cl. .......................... 345/173; 345/163; 345/167
[58] Field of Search .................................. 345/167, 169, 345/173–179, 163–166

[56] References Cited

U.S. PATENT DOCUMENTS 5,115,107  5/1992  Crooks et al. ........................ 345/178

*Primary Examiner*—Jeffery Brier
*Attorney, Agent, or Firm*—Blakely, Sokoloff, Taylor & Zafman

[57] ABSTRACT

In a computer system having an input device for controlling a position of a cursor on a display screen, a method of compensating for a physical orientation of the input device relative to the display screen. Initially, the physical orientation of the input device in relation to the display screen is determined. If the input device has been rotated, a first set of values corresponding to movement in the X axis is swapped with a second set of values corresponding to movement in the Y axis. Next, the sign of the first set of values corresponding to the Y axis is changed. Thereby, a horizontal movement indicated by the rotated input device produces a horizontal movement of the cursor. Likewise, a vertical movement indicated by the rotated input device corresponds to a vertical movement of the cursor.

14 Claims, 8 Drawing Sheets

FIG _2

FIG_3

5,469,194

APPARATUS AND METHOD FOR PROVIDING DIFFERENT INPUT DEVICE ORIENTATIONS OF A COMPUTER SYSTEM

FIELD OF THE INVENTION

The present invention pertains to the field of input devices for controlling cursor movement on a computer display. More particularly, the present invention relates to an apparatus and method for providing different input device orientations of a computer system.

BACKGROUND OF THE INVENTION

Presently, computer systems such as personal computers, workstations, laptops, notebook computers, etc. are experiencing ever increasing popularity due to their increased processing power, speed, versatility, and economy. With the virtual explosion in the number and the different types of computer systems, there has been a corresponding degree of demand for input devices used to facilitate the human interaction with these computer systems. In the past, the primary input device simply consisted of a keyboard. The human operator entered data by typing on alpha-numeric, special function, and arrow keys from the keyboard. The entered data was usually displayed on a computer screen.

Subsequently, a more sophisticated and user-friendly interface encompassing the use of a cursor to perform editing and selection functions was developed. Typically, an input device coupled to the computer system is manipulated by the user to control the movement of the cursor on the display screen. One or more buttons are used to perform the desired selection functions. For example, a user can place a cursor over an icon displayed on the computer screen. Thereupon, the icon can be selected by clicking the button. This "point-and-click" feature has proven to be extremely popular and has gained wide acceptance.

There are several different types of input devices for controlling the cursor that are commercially available today. These input devices can take many different forms, such as a mouse, a trackball, a joystick, a writing pen, a stylus tablet, to name a few. One of the most promising and exciting new developments in the future of input devices is the use of touchpads. Touchpads sense the inherent capacitance associated with a user's finger. Thereby, a cursor can be controlled according to the movement of a user's finger. In other words, a user can simply trace a finger across the touchpad. The computer mimics this movement and drags the cursor across the screen to any desired location.

Typically, the computer has a rectangular shaped screen. In most instances, the width of the computer screen is greater than its height. In an effort to track the general contour of the computer screen, trackpads are usually designed to also be rectangular. Thereby, movement along the X-axis of the touchpad causes the cursor on the computer screen to move horizontally, and movement along the Y-axis of the touchpad produces a vertical cursor movement.

However, when implementing a touchpad or some other type of input device in various computer systems, there might be instances wherein it is difficult or impossible to incorporate the touchpad in its preferred or suggested orientation. For example, in the layout of laptop computers, the various components are typically crammed together in order to minimize its size. There might not be enough room to physically fit the touchpad in the limited amount of space available.

One possible solution is to rotate the trackpad to an orientation so that it can be accommodated by the surrounding components. However, the problem one now faces is how to design the touchpad so that it acknowledges that its orientation has been rotated and adapts to its new orientation accordingly. For example, if the touchpad is rotated 90 degree so that its height is greater than its width, the touchpad should recognize vertical movements as being vertical rather than horizontal and vice versa. In other words, once the touchpad has been rotated, its sense lines should be horizontal, and its trace lines should be vertical.

Hence, there exists a need in the prior art for an apparatus and method that provides for different orientations of a touchpad or other similar input devices so that cursor movements will be correctly traced on the computer screen. It would be highly preferable if such an apparatus and method were to operate transparent to the user.

SUMMARY OF THE INVENTION

The present invention pertains to a method of compensating for a physical orientation of an input device in relation to a computer system. The method provides that the cursor movement displayed on the computer screen tracks the movement indicated by the input device, irrespective of the orientation of the input device. Initially, the physical orientation of the input device in relation to the display screen is determined. If the input device has been rotated, a first set of values corresponding to movement in the X axis is swapped with a second set of values corresponding to movement in the Y axis. Next, the sign of the first set of values corresponding to the Y axis is changed. Thereby, a horizontal movement indicated by the rotated input device produces a horizontal movement of the cursor. Likewise, a vertical movement indicated by the rotated input device corresponds to a vertical movement of the cursor.

In one embodiment, a patch code is called by a service routine. The patch code masks out the button(s). Next, it swaps the X and Y values generated by the input device and changes the sign of the new Y values. These new X and Y values are then substituted in place of the old X and Y values. Thereupon, the code returns to the service routine. Hence, these operations are transparent to the user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for providing different input device orientations is described. In the following description, for purposes of explanation, numerous specific details are set forth, such as angle of rotation, service routine, patch code, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Although the following description is in relation to a touchpad, it will be appreciated that the present invention pertains to other types of input devices and can be implemented by a variety of different mechanisms.

Figure 1:
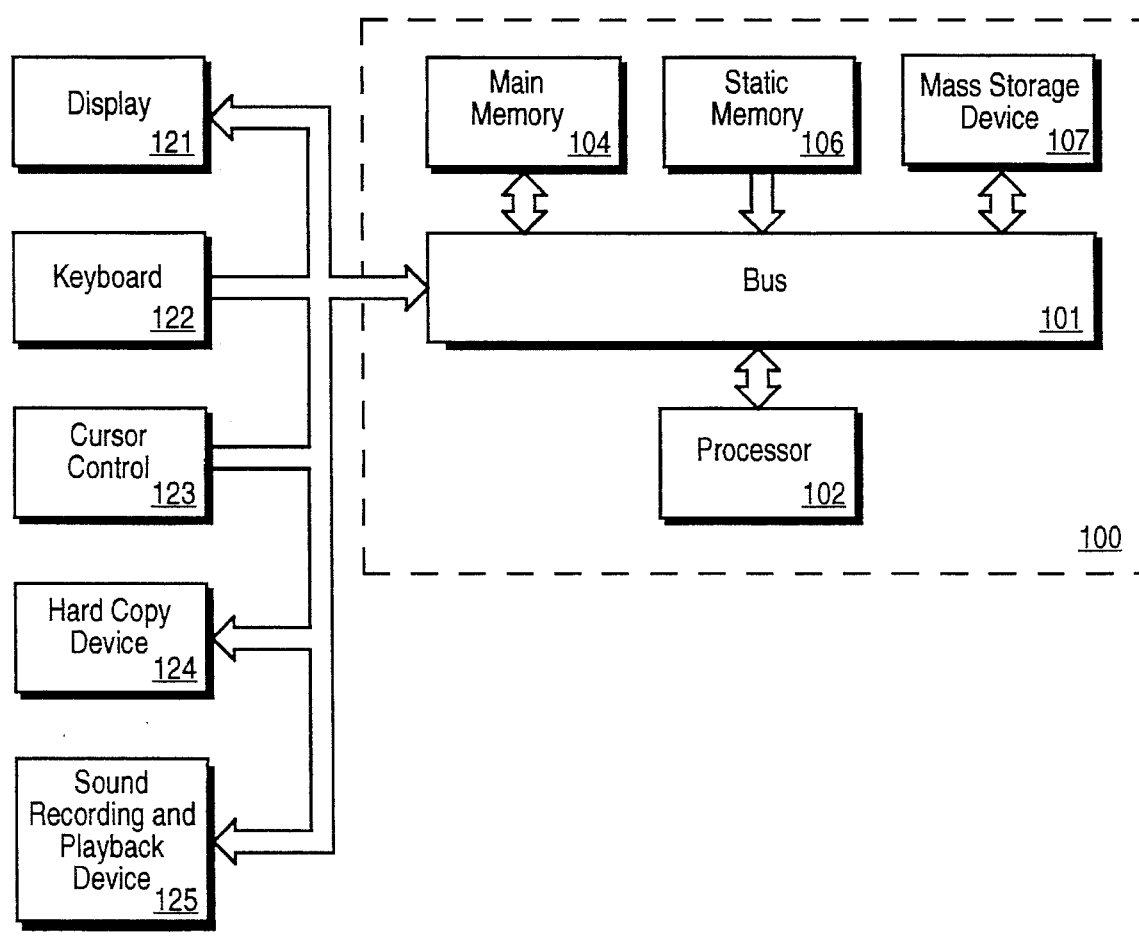
FIG. 1 shows the computer system upon which a preferred embodiment of the present invention is implemented.

Referring to FIG. 1, the computer system upon which a preferred embodiment of the present invention is implemented is shown as 100. Computer system 100 is comprised of a bus or other communication means 101 for communicating information. A microprocessor 102 is coupled with bus 101 for processing digital data. Computer system 100 is further comprised of a random access memory (RAM) or some other dynamic storage device 104 (referred to as main memory), which is also coupled to bus 101. Main memory 104 is used to store digital data and program instructions to be executed by processor 102. Main memory 104 also may be used for storing temporary variables or other intermediate information during execution by processor 102. Computer system 100 also includes a read only memory (ROM) and/or other static storage device 106 coupled to bus 101 for storing static information and instructions for processor 102. In addition, a data storage device 107 such as a magnetic disk or optical disk and its corresponding disk drive may also be included.

Computer system 100 may further include a display device 121, such as a cathode ray tube (CRT) or liquid crystal display (LCD) coupled to bus 101 for displaying information to a computer user. An alphanumeric input device 122 (e.g., a keyboard) may also be coupled to bus 101 for communicating information and command selections to processor 102. An additional user input device which may be coupled to bus 101 is cursor control 123. Input device 123 may take many different forms, such as a mouse, a trackball, stylus, touchpad, etc. Another device which may be coupled to bus 101 is hard copy device 124 which may be used for printing a hard copy on paper. It should be noted that any or all of the components of computer system 100 and associated hardware may be used in conjunction with the present invention. However, it is appreciated that any type of configuration of the system may be used for various purposes as the user requires.

In the currently preferred embodiment, computer system 100 is one of the Macintosh® family of personal or laptop computers such as the Macintosh® Quadra®, Performa®, Powerbook®, etc. brand personal computers manufactured by Apple® Computer, Inc. of Cupertino, Calif. (Apple, Macintosh, Quadra, Performa, and Powerbook are registered trademarks of Apple Computer, Inc.). Processor 102 is one of the 68000 families of microprocessors, such as the 68030 or 68040 manufactured by Motorola, Inc. of Schaumburg, Ill.

Figure 2:
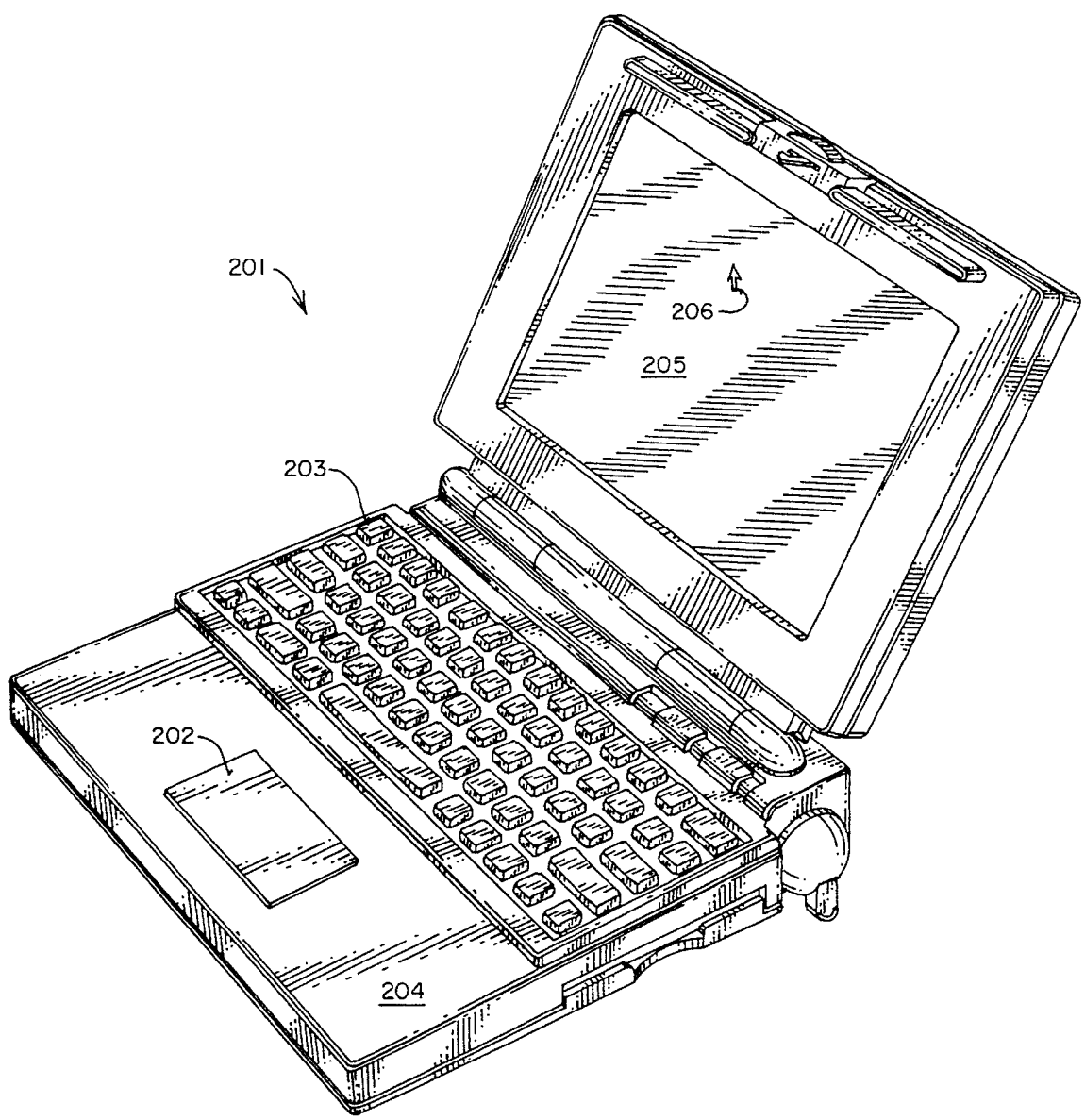
FIG. 2 shows a perspective view of a computer system having a horizontally oriented rectangular touchpad.

FIG. 2 shows a perspective view of a computer system 201 having a horizontally oriented rectangular touchpad 202. Personal computer 201 includes a keyboard 203, palm rests 204, display screen 205 and touchpad 202. Finger movements detected by touchpad 202 is used to control the movement of cursor 206 on screen 205. Although computer 201 can be any of a variety of computers, in the presently preferred embodiment, it is comprised of a laptop computer which is a single, integrated unit with all of its elements placed within one case and which is small enough to fit onto a user's lap. Inside computer system 201 reside all the essential and well known electronic circuitry for the computer's operation, such as CPU, memory, hard and/or floppy disk drive, I/O circuitry, and power supply.

Figure 3:
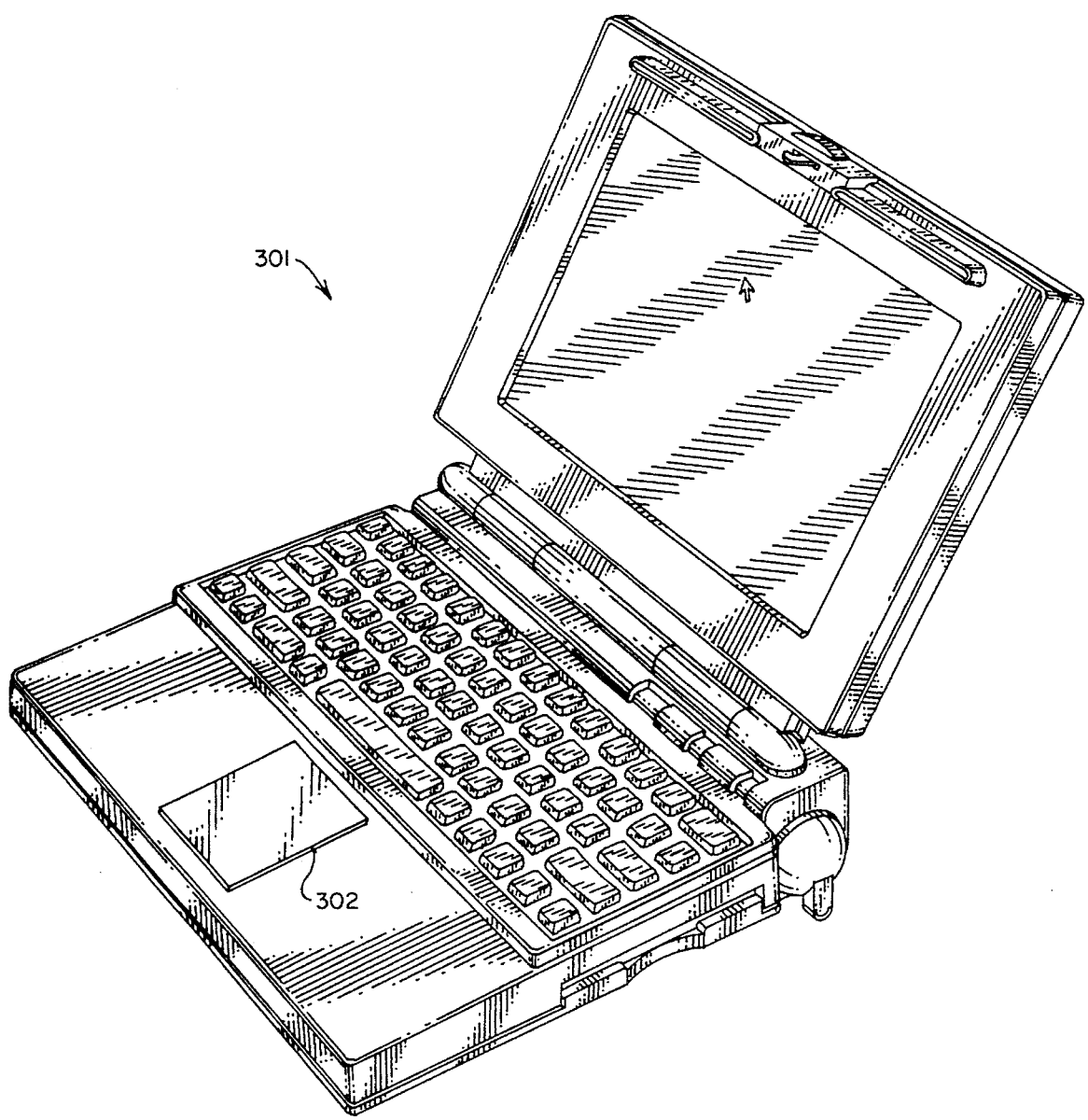
FIG. 3 shows a perspective view of a computer system having a vertically oriented rectangular touchpad.

FIG. 3 shows a perspective view of a computer system 301 having a vertically oriented rectangular touchpad 302. Essentially, the vertically oriented touchpad 302 has been rotated 90 degrees clockwise in reference to the horizontally oriented touchpad shown in FIG. 2.

Figure 4:
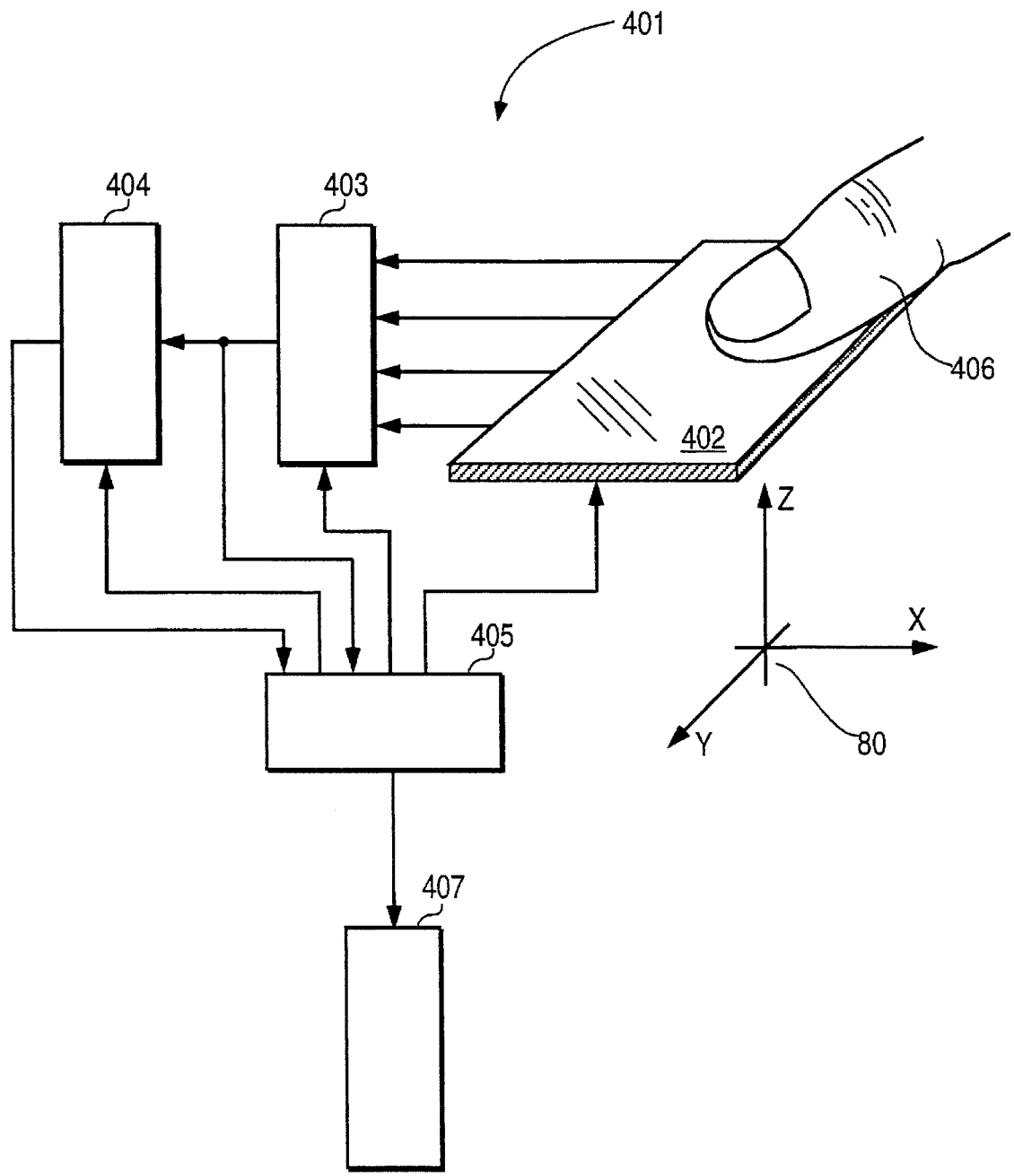
FIG. 4 shows an example of a touch sensitive input device as may be utilized by the present invention.

FIG. 4 shows an example of a touch sensitive input device 401 as may be utilized by the present invention. The touch sensitive input device 401 is comprised of a virtual electrode pad 402, an electrical balance measurement circuit 403, balance ratio determination circuit 404, and control circuit 405. In one embodiment, the virtual electrode pad 402 is in the shape of a rectangular sheet. It is capable of forming "virtual electrodes" at various positions on its top and bottom surfaces. These electrodes are denoted as "virtual electrodes" since separate conductive strips on the two sides of pad 402 are used to form single elements denoted as "virtual electrodes." The virtual electrodes are connected to electronic circuitry capable of measuring the electrical balance between selected top and bottom virtual electrodes.

A balance ratio determination circuit 404 is provided to determine the ratio of one balance measurement to another. Control circuit 405 selects appropriate electrodes for balance measurement and ratio determination. The control circuit 405 responds to balance ratios to calculate position information of the sensed object (e.g., finger 406). This information may include position along one or two axes parallel to the electrode pad surface. Additional "proximity" information along an axis perpendicular to the surface of electrode pad 402 may also be determined from an appropriate balance measurement. Position information determined by control circuit 405 is provided to a utilization means 407 which may be any of a variety of electronic or computer devices.

A finger 406 is shown located with its tip in close proximity to the top surface of electrode pad 402. The position of the finger tip over some region in the x and y directions may be sensed, as may its proximity in the z direction by virtual electrode pad 402. The touch sensitive input device 401 may provide information indicative of an operator's finger position to a computer, similar to the function commonly performed by a computer mouse. The device 401 may be a separate pad which could be held in the hand, placed on a desktop, or built into the computer keyboard.

Figure 5A:
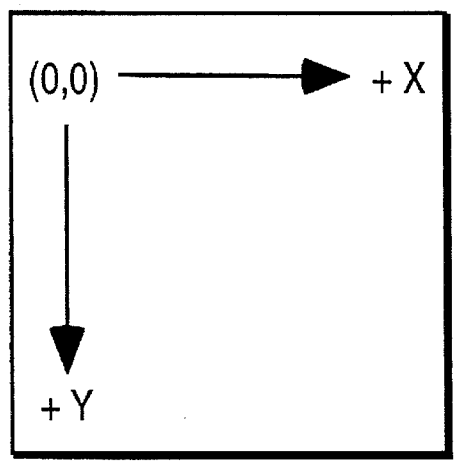
FIG. 5A shows the coordinate system corresponding to a horizontally oriented input device.

FIG. 5A shows the coordinate system corresponding to a horizontally oriented input device. It can be seen that the origin (0,0) resides in the upper leftmost point. Horizontal movement to the right of the origin corresponds to increasing positive X values. Likewise, a downwards vertical movement with respect to the origin corresponds to increasing positive Y values.

Figure 5B:
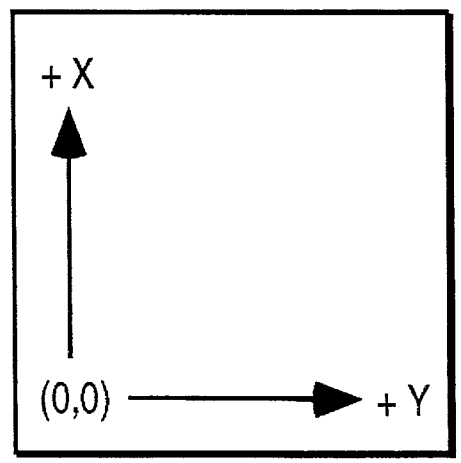
FIG. 5B shows the coordinate system corresponding to a vertically oriented input device.

FIG. 5B shows the coordinate system corresponding to a vertically oriented input device. In other words, the touchpad of FIG. 5B is the same as that of FIG. 5A, except that it has been physically rotated counterclockwise by 90 degrees. It can be seen that the origin (0,0) resides in the lower leftmost point. Horizontal movement to the right of the origin corresponds to increasing positive Y values. Likewise, an upwards vertical movement with respect to the origin corresponds to increasing positive X values.

Basically, the "rotated" data corresponding to the rotated touchpad is "unrotated" by swapping the X and Y values generated by the device and then changing the sign of the new Y values. In the currently preferred embodiment, a software patch is installed in the service routine of a bus protocol (e.g., Apple Desktop Bus—ADB) corresponding to that particular input device. This patch includes a rotation code that intercepts the X and Y data from the input device. This data is "unrotated" and the new "unrotated" data is stuffed back over the top of the original X and Y data. Thereupon, the original service routine is called. The computer system is informed of the switch in rotation through a control panel. A user can select an icon corresponding to the input device to be rotated.

Figure 6:
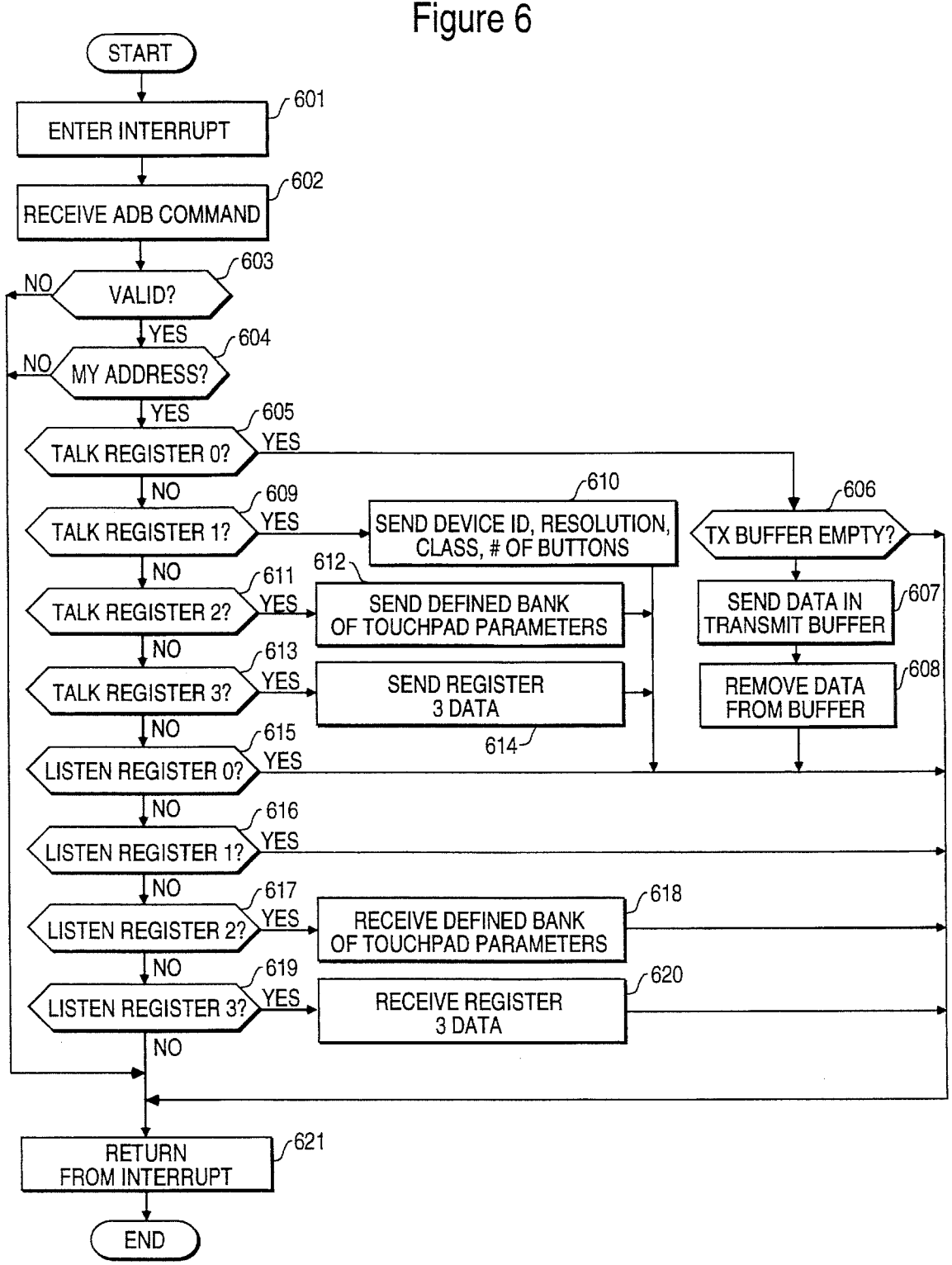
FIG. 6 is a flowchart describing the steps for handling an interrupt service routine associated with an ADB protocol.

FIG. 6 is a flowchart describing the steps for handling an interrupt service routine associated with an ADB protocol. When commanded by the computer system, the microcontroller enters the interrupt, step 601. An ADB command is received, step 602. Thereupon, the microcontroller determines whether the received command is valid, step 603. If the received command happens to be invalid, the microcontroller returns from the interrupt with an error, step 621. Otherwise, the microcontroller determines whether the command was addressed to it, step 604. If the microcontroller was not addressed, the command is ignored and the microcontroller returns from the interrupt, step 621.

If, however, the microcontroller is being addressed, the microcontroller either talks or listens to one of the four ADB defined registers as specified by the command, steps 605–620. In step 605, a determination is made as to whether the received command specifies that the microcontroller talk to Register 0. Register 0 is used to store communication information that pertains to all of the different types of input devices (e.g., mouse, trackball, touchpad, etc.). If the microcontroller is commanded to talk to Register 0, then steps 606–608 are executed. In step 606, the pointer of the transmit TX buffer is checked to determine whether that buffer is currently empty. The TX buffer is comprised of a first-in-first-out FIFO buffer. If there is no data in the TX buffer, the microcontroller returns from the interrupt, step 621. However, if the TX buffer is not empty, the first two bytes in the TX buffer is sent over the ADB bus to the computer system, step 607. Thereupon, the data that had just been sent is removed from the TX buffer, step 608. At the end of step 608, the microcontroller returns from the interrupt, step 621.

In step 609, a determination is made as to whether the received command specifies that the microcontroller talk to Register 1. Register 1 is used to store information pertaining to an extended ADB mode. Some examples of the information that can be stored in Register 1 include the device ID, the resolution, the class, the number of buttons, etc. If the command specifies that the microcontroller talk to Register 1, step 610 is performed. Otherwise, the process proceeds to step 611. In step 610, the information stored in Register 1 is sent over the ADB bus to the computer system. At the completion of this transmission, the microcontroller returns from the interrupt, step 621.

In step 611, a determination is made as to whether the received command specifies that the microcontroller talk to Register 2. If so, step 612 is executed. Otherwise, the process proceeds to step 613. In step 612, a defined bank of touchpad parameters in Register 2 is sent to the computer system via the ADB bus. Thereupon, the microcontroller returns from the interrupt, step 621.

In step 613, a determination is made as to whether the received command specifies that the microcontroller talk to Register 3. If so, step 614 is executed. Otherwise, the process proceeds to step 614. In step 614, the data stored in Register 3 is sent to the computer system via the ADB bus. Examples of data that can be stored in Register 3 include the Handler ID, data for resolving address conflicts, collision detection and resolution, etc. Once this data has been sent, the microcontroller returns from the interrupt, step 621.

In steps 615–616, a determination is made as to whether the received command specifies that the microcontroller listen to Register 0 or 1. If so, the microcontroller returns from the interrupt, step 621. Otherwise, the process proceeds to step 617.

In step 617, a determination is made as to whether the received command specifies that the microcontroller listen to Register 2. If so, the microcontroller takes the data supplied by the computer system on the ADB bus and loads it into Register 2. Some examples of the data that can be stored into Register 2 at the command of the computer system include smoothing parameters, filtering coefficients, Z-tracking threshold values, raw (X, Y, and Z) data, etc. Once this data has been loaded into Register 2, the microcontroller returns from the interrupt, step 621.

Finally, in step 3, a determination is made as to whether the received command specifies that the microcontroller listen to Register 3. This command is usually performed at boot-up. Register 3 data may include a different Handler ID, enabling the interrupt service routine, a change in address, etc. This data is supplied by the computer system via the ADB bus and stored in Register 3 by the microcontroller, step 620. Thereupon, the microcontroller returns from the interrupt, step 621.

Figure 7:
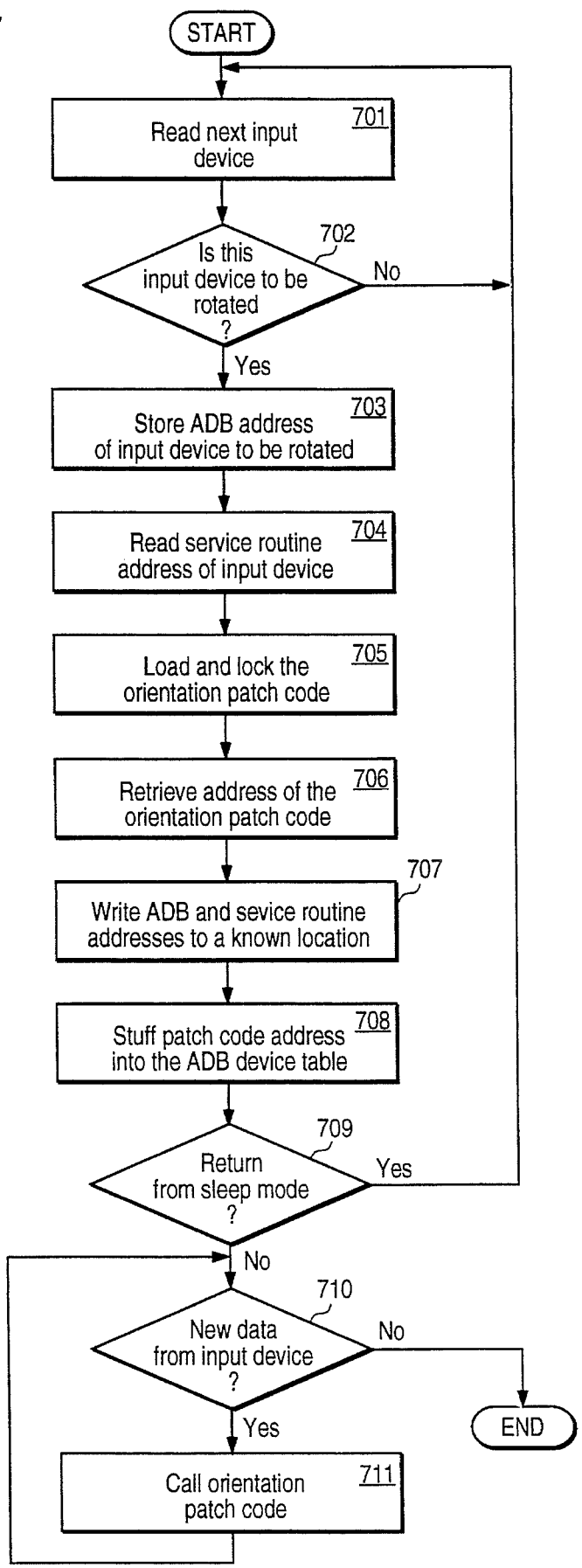
FIG. 7 is a flowchart describing the steps for installing an orientation patch code.

The orientation patch code is installed in an INIT which is part of the device's control panel. FIG. 7 is a flowchart describing the steps for installing an orientation patch code. Initially, a loop is performed whereby the ADBDataBlock is read for each installed device, steps 701–702. The loop searches for an original ADB address and handler ID that matches that of the input device which is to be rotated. Once the device is found, its ADB address is temporarily stored, step 703. Furthermore, its service routine address is read from the ADBDataBlock, step 704. Next, the code resource that contains the orientation patch code is loaded and locked, step 705. Its address is retrieved, step 706.

Thereupon, the input device's ADB address and its original service routine address are put in a location where the patch code can find it, step 707. For example, these addresses can be written to a few reserved bytes at the beginning of the patch. The patch code's address is then stuffed into the ADB device table by calling the SetADBInfo( ) subroutine with the new data, step 708. Finally, the ADBReInit procedure can repeat steps 701–708 described above after the computer system comes out of a sleep mode, step 709. Henceforth, the orientation patch code will be called each time the input device sends data, step 710.

Figure 8:
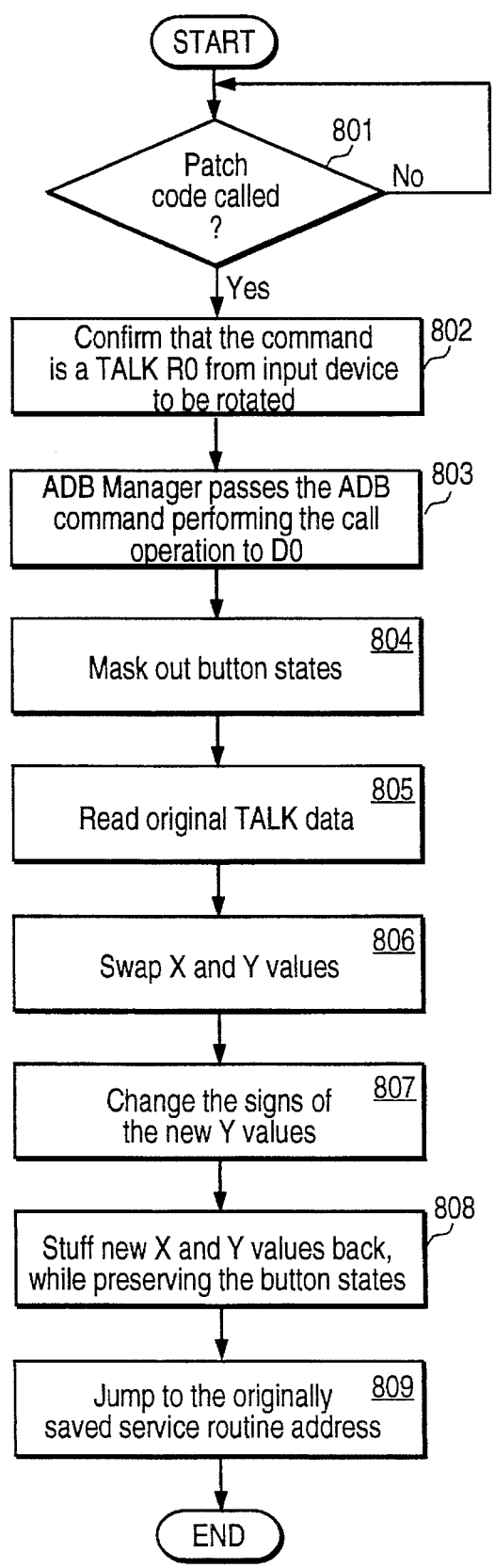
FIG. 8 shows a flowchart describing the steps performed by the patch code.

The orientation patch code performs the following functions. Referring to FIG. 8, a flowchart describing the steps performed by the patch code is shown. When the patch code is initially called, step 801, it confirms that the command is a TALK R0 from the input device to be rotated, step 802.

The ADB Manager then passes the ADB command that performed the call operation to D0, step 803. This can be accomplished by a compare operation. Next, the button states are masked out, step 804. The original TALK data is read, step 805. Thereupon, the original X and Y values are swapped, step 806. The signs of the new Y values are then changed, step 807. Afterwards, these new X and Y values are stuffed back in place of the original values, while preserving the button states, step 808. Finally, a jump to the originally saved service routine address is performed, step 809.

It should be appreciated that the present invention also applies to those orientations other than vertical and horizontal. For example, if the touchpad, mouse, trackball, pen, or grid-based input device were physically rotated by 30 degrees, the new X values can be calculated by determining the cosine of 30° multiplied by the original X values. Similarly, the new Y values are equal to the sine of 30° multiplied by the original Y values.

An example of how the data is to be manipulated for a vertically oriented touchpad is described below. The original data is shown below in Table 1.

TABLE 1

| | Byte Bit # | | | | | | | | |
|---|---|---|---|---|---|---|---|---|---|
| 7 | 6 | 5 | 4 | 3 | 2 | 1 | 0 | | |
| 0 | b0 | y6 | y5 | y4 | y3 | y2 | y1 | y0 | ←1 (a0) |
| 1 | b1 | x6 | x5 | x4 | x3 | x2 | x1 | x0 | ← 2 (a0) |
| 2 | b2 | y9 | y8 | y7 | b3 | x9 | x8 | x7 | ←3 (a0) |

This data is pointed to by the A0 register. The Talk register 0 commands have three bytes as shown. The byte b0 corresponds to the button state. Bytes b1, b2, and b3 are not used. The data bits x0–x9 and y0–y9 represent the ten bits of relative axis movement. After the orientation patch code has manipulated this data, it now appears as shown in Table 2 below.

TABLE 2

| | Byte Bit # | | | | | | | | |
|---|---|---|---|---|---|---|---|---|---|
| 7 | 6 | 5 | 4 | 3 | 2 | 1 | 0 | | |
| 0 | b0 | x6 | x5 | x4 | x3 | x2 | x1 | x0 | ←1 (a0) |
| 1 | b1 | −y6 | −y5 | −y4 | −y3 | −y2 | −y1 | −y0 | ← 2 (a0) |
| 2 | b2 | x9 | x8 | x7 | b3 | −y9 | −y8 | −y7 | ←3 (a0) |

Thus, an apparatus and method for providing different input device orientations of a computer system is described.

What is claimed is:

1. In a computer system having an input device for controlling a position of a cursor on a display screen, a method of compensating for a physical orientation of said input device relative to said display screen, said method comprising the steps of:

determining said physical orientation of said input device in relation to said display screen;

if said input device has a horizontal orientation, transmitting a first set of values corresponding to an X axis and a second set of values corresponding to a Y axis generated by said input device to said computer system, wherein a horizontal movement indicated by said input device corresponds to a horizontal movement of said cursor and a vertical movement indicated by said input device corresponds to a vertical movement of said cursor;

if said input device has a vertical orientation:

exchanging said first set of values generated by said input device with said second set of values generated by said input device, wherein said second set of values correspond to said X axis and said first set of values correspond to said Y axis;

changing a sign of said first set of values corresponding to said Y axis;

transmitting said first set of values corresponding to said Y axis and said second set of values corresponding to said X axis, wherein a horizontal movement indicated by said input device in said vertical orientation corresponds to a horizontal movement of said cursor and a vertical movement indicated by said input device in said vertical orientation corresponds to a vertical movement of said cursor.

2. The method of claim 1 further comprising the steps of:

reading identifications of input devices coupled to said computer system to determine which of said input devices is to be rotated;

reading a service routine address corresponding to said input device to be rotated;

writing said service routine address to a known location;

calling a patch code for performing said exchanging and said changing steps;

returning to said service routine based on said service routine address that was stored.

3. The method of claim 1 further comprising the step of masking out a button state.

4. The method of claim 1, wherein said input device is comprised of a touch sensitive device.

5. The method of claim 1, wherein said input device is comprised of a mouse.

6. The method of claim 1, wherein said input device is comprised of a trackball.

7. The method of claim 1, wherein said computer system is comprised of a laptop computer.

8. The method of claim 7, wherein said input device is comprised of a touchpad residing below a keyboard of said laptop computer.

9. A method of controlling a cursor movement on a computer screen of a computer system in relation to commands received by an input device, wherein said cursor movement tracks movement detected by said input device regardless of a physical orientation of said input device with respect to said computer system, said method comprising of the steps of:

determining whether said input device coupled to said computer system is in a rotated orientation;

if said input device is in said rotated orientation:

swapping a first set of data corresponding to movement in a first axis with a second set of data corresponding to movement in a second axis;

changing a sign of said second set of data;

transmitting said first set of data and said second set of data after performing said swapping and said changing steps to said computer system, wherein movement in said first axis detected by said input device which has been rotated is translated into movement of said cursor in said first axis and movement in said second axis detected by said input device which has been rotated is translated into movement of said cursor in said second axis.

10. The method of claim 9 further comprising the steps of:

reading a service routine address corresponding to said input device to be rotated;

writing said service routine address to a known location;

calling a patch code for performing said swapping and said changing steps;

returning to said service routine based on said service routine address that was stored.

11. The method of claim 9 further comprising the step of masking out a button state.

12. The method of claim 9, wherein said input device is comprised of a touch sensitive device placed below a keyboard of a laptop computer.

13. The method of claim 9, wherein said input device is comprised of a mouse.

14. The method of claim 9, wherein said input device is comprised of a trackball.

* * * * *